March 23, 1954     W. G. CORSON     2,672,910
NONSKID TIRE AND METHOD FOR MAKING THE SAME Filed March 25, 1948

INVENTOR
WILLIAM G. CORSON

BY William Cleland
Attorney

Patented Mar. 23, 1954

2,672,910

UNITED STATES PATENT OFFICE 2,672,910

NONSKID TIRE AND METHOD FOR MAKING THE SAME

William G. Corson, Akron, Ohio

Application March 25, 1948, Serial No. 17,087

6 Claims. (Cl. 152—211)

This invention relates to non-skid rubber tires and to procedure for making the same.

Pneumatic tires of well known type comprise a fabric-reinforced carcass and a ground-engaging tread body thereon of semi-hard vulcanized rubber or like stock. The usual non-skid configurations molded in the tread body, while satisfactory for ordinary weather conditions, are not entirely satisfactory for use on icy road surfaces. Attempts have been made in the past to provide a tire for winter driving use, wherein various abrasive materials have been added to the tread stock to provide desired additional non-skid effect, but such attempts have not proved entirely satisfactory, as for the reason that the added abrasive material has detracted from other desirable qualities of the tread stock, or that the added material has had a tendency to work its way through the tire wall in a manner which was detrimental, or that the abrasive material has been difficult to mill uniformly into the tread stock in the usual tread-stock manufacturing procedures.

One object of the present invention is to provide rubber or like tread stock for pneumatic tires, having incorporated therein skid-resisting elements which will provide a maximum of resistance to skidding of the tire on icy pavement, for example, without materially affecting desired normal resiliency and flexibility of the main tread body of the tire.

Another object of the invention is to provide an improved rubber tread body in a pneumatic tire, having skid-resisting or frictional particles bonded therein in a manner which obviates any tendency thereof to work through the rubber of the tread body, inwardly or outwardly of the tire.

Still another object of the invention is to provide a method for producing rubber tread stock for pneumatic tires, either for new tires or for use as repair stock or "camel-back," wherein is facilitated the uniform distribution of skid-resisting elements throughout the stock.

Other objects of the invention will be manifest from the following brief description and the accompanying drawings.

Figure 1:
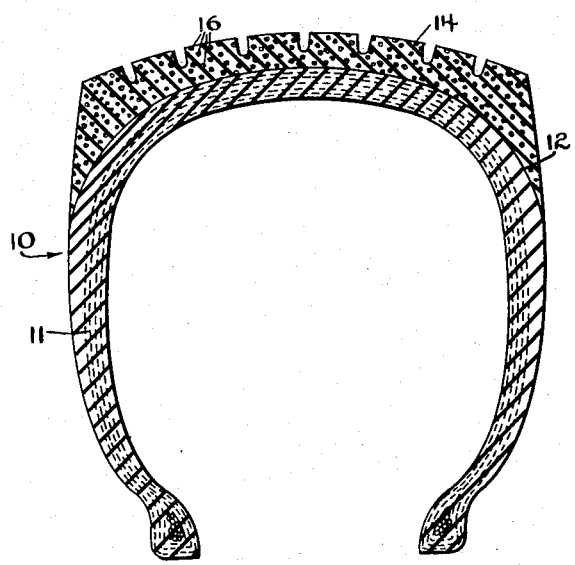
Figure 1 is a transverse cross-section through a pneumatic tire casing, having incorporated therein the improved tread body embodying the features of the invention.
Figure 2:
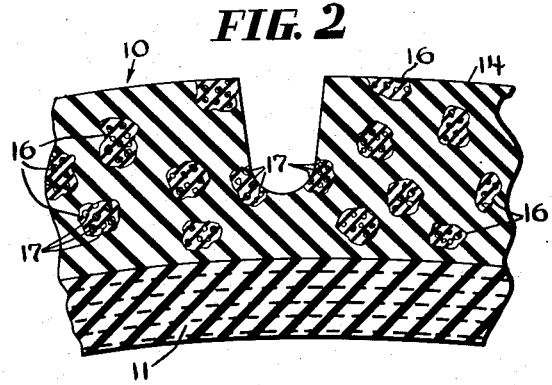
Figure 2 is an enlarged fragmentary cross-section of the tread portion of the tire shown in Figure 1.

Referring to the drawings, the numeral 10 designates a pneumatic tire of known general type including a rubberized fabric casing 11, which has been repaired by having a portion of its rubber tread portion removed, as by buffing to the surface indicated at 12, the old tread having been replaced by a new tread body 14 adhered to the casing in known manner and vulcanized thereto in the usual vulcanizer (not shown) under the influence of heat and pressure. The tread body 14 may, therefore, have any desired non-skid configurations formed therein by the vulcanizing mold.

The tread body 14 may be generally of semi-hard vulcanized rubber or equivalent vulcanizable elastomer to provide desired characteristics to the same with respect to maximum wear, resiliency, flexibility, etc. To provide maximum skid-resisting quality to the tread stock for use of the tire on icy surfaces, for example, there may be incorporated therein a plurality of relatively closely spaced pieces 16 of relatively harder vulcanized rubber than the tread body material, each piece 16 having embedded therein a plurality of relatively smaller particles 17 of abrasive or frictional material, such as silicon carbide, commonly known by the trade-mark "Carborundum."

The spacing and size of the hard rubber pieces 16 are proportioned to provide maximum non-skid effect without stiffening of the tread body stock to an extent which would detract materially from the aforementioned normally desired characteristics of the tread rubber, and particularly the resiliency thereof. The average size of said pieces 16 may vary in different sizes of tires, but preferably they are large enough to contain a plurality of the relatively small discrete particles 17 of the skid-resisting material.

In one method of producing the above described tread stock, a batch of materials for producing rubber or rubber-like elastomer, is mixed in known manner in a rubber mill or other mixing or plasticizing device, together with a predetermined quantity of said silicon carbide particles 17, or other suitable abrasive material. When the rubber is of desired plasticity, with the particles 17 properly disposed in uniformly discrete relation, the stock is removed from the mill, usually in sheet form. The milled stock is then vulcanized to full hardness in any suitable manner, as in open steam in a vulcanizing chamber, and thereafter ground, cut or otherwise reduced to provide said small pieces 16 each containing a number of the smaller particles 17. These vulcanized pieces may be of relatively harder rubber than the semi-hard rubber of the tread stock.

By another method, the stock with the particles 17 mixed therein may be extruded as string-like material from a suitable extruding machine, the string-like material then being cut or otherwise reduced to pieces 16 of desired smaller size. The pieces 16 may be partly or fully vulcanized as before.

In any case a predetermined quantity of the pieces 16 may now be mixed in with a batch of tread stock, of rubber or like vulcanizable elastomer, in a rubber mill or plasticizer. When the tread stock is of desired plasticity, with the pieces 16 uniformly distributed, it may be removed (from the mill), in strips of desired width and thickness for use as tire-repair "camel-back," or the material may be continuously extruded from an extruding machine as tread-stock of desired cross-section, as for use in the fabrication of new tires. In either case a pneumatic tire provided with a tread body 14 of the improved tread stock is vulcanized by any suitable means to cure the same to desired resiliency, the pieces 16 thereby becoming thoroughly bonded to the tread rubber.

In some instances the step of vulcanizing the pieces 17 prior to mixing with the tread body stock may be omitted.

In use of a new or a repaired vehicle tire provided with the improved tread body thereon the hard-rubber pieces 16 will wear down more slowly than the softer tread rubber, and thereby add non-skid effect to the skid-resisting particles 17, in said hard rubber pieces. The pieces 17 are particularly effective to prevent skidding of the tire on icy surfaces.

In some circumstances the stock from which the pieces 17 are reduced may be partially vulcanized instead of fully vulcanized, as described, prior to the reducing operation, in which case vulcanization of the rubber pieces will be completed when the tread body is vulcanized on the tire. It is also contemplated that frictional materials other than silicon carbide may be utilized effectively. For example, an aggregate of sand may be used. The hard rubber of the pieces 16 would similarly serve as an effective medium for retaining sawdust in the tread body without the oils, resins, etc., normally found in sawdust causing the rubber of the tread body to deteriorate by becoming hard or brittle, sawdust being a very good non-skid medium for the present purposes. Thus any suitable abrasive or non-skid material which will mix with rubber and bond thereto in vulcanization, may serve in place of silicon carbide.

What is claimed is:

1. A tire having a tread body of rubber or like elastic material, said tread body having bonded therein particles of rubber or like elastic material distinct from the material of the body and being in closely spaced relation without substantially detracting from the inherent resiliency of the elastic material of the body, said particles having embedded therein a plurality of discrete smaller particles of silicon carbide.

2. A tire having a tread body of vulcanized rubber or like elastic material, said tread body having incorporated therein pieces of vulcanizable material which will become bonded thereto by subsequent vulcanizing heat and pressure and being in closely spaced relation without substantially detracting from the inherent resiliency of the elastic material of the body, said pieces in general each having embedded therein a plurality of relatively small discrete particles of skid-resisting abrasive material.

3. A tire having a tread body of vulcanized rubber or like elastic material, said tread body having incorporated throughout the same pieces of vulcanized rubber or like elastic material in closely spaced relation without substantially detracting from the inherent resiliency of the elastic material of the body, the pieces being bonded within the body material by heat of vulcanization, said pieces having incorporated therein a plurality of discrete particles of skid-resisting material.

4. The process of making tread bodies for pneumatic tires, comprising the steps of milling together a batch of unvulcanized rubber or like vulcanizable elastomer and particles of tire skid-resisting material to have the particles in substantially uniformly spaced but discrete relation in the resulting milled stock, cutting the milled stock into relatively small pieces each in general containing a plurality of smaller said discrete particles, and milling together unvulcanized rubber or like vulcanizable elastomer and said pieces of stock in proportions to have the pieces in discrete relation.

5. The process of making tread bodies for pneumatic tires, comprising the steps of milling together a quantity of unvulcanized rubber or like vulcanizable elastomer which is adapted to be harder than tread stock and particles of abrasive material to have the particles in substantially uniformly spaced but discrete relation in the resulting milled stock, at least partially vulcanizing the milled stock with the particles therein, cutting the vulcanized stock into relatively small pieces each in general containing a plurality of said discrete particles of relatively smaller particle size, and milling together unvulcanized tread rubber or like vulcanizable elastomer and said pieces of at least partially vulcanized stock in proportions to have the pieces in discrete relation.

6. The process of making tread bodies for tires, comprising the steps of milling together a quantity of unvulcanized relatively hard rubber or like vulcanizable elastomer and particles of silicon carbide to have the particles in substantially uniformly spaced but discrete relation in the resulting milled stock, cutting the milled stock into relatively small pieces each in general containing a plurality of the smaller said discrete particles of said silicon carbide, and milling unvulcanized rubber or like vulcanizable elastomer which is relatively softer than said hard rubber together with said pieces of stock in proportions to have the pieces in discrete relation.

WILLIAM G. CORSON.

References Cited in the file of this patent

UNITED STATES PATENTS

| Number | Name | Date |
| --- | --- | --- |
| 1,257,698 | Gleason | Feb. 26, 1918 |
| 1,330,988 | Sayre | Feb. 17, 1920 |
| 1,398,975 | Renos | Dec. 6, 1921 |
| 1,948,311 | Orr | Feb. 20, 1934 |
| 1,973,748 | Caldwell | Sept. 18, 1934 |
| 2,084,784 | Stahl | June 22, 1937 |
| 2,171,438 | Tarbox | Aug. 29, 1939 |
| 2,207,098 | Maynard | July 9, 1940 |
| 2,239,070 | Work | Apr. 22, 1941 |

FOREIGN PATENTS

| Number | Country | Date |
| --- | --- | --- |
| 20,820 | Great Britain | 1910 |
| 23,636 | Australia | Feb. 3, 1936 |